(12) United States Patent
Zeng

(10) Patent No.: US 9,179,044 B2
(45) Date of Patent: Nov. 3, 2015

(54) COLOR CALIBRATION

(75) Inventor: Huanzhao Zeng, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1799 days.

(21) Appl. No.: 11/827,741

(22) Filed: Jul. 13, 2007

(65) Prior Publication Data

US 2009/0019365 A1 Jan. 15, 2009

(51) Int. Cl.
*H04N 1/60* (2006.01)

(52) U.S. Cl.
CPC .................. *H04N 1/6033* (2013.01)

(58) Field of Classification Search
USPC ......... 358/518, 1, 9, 406, 501, 515, 522, 523; 382/167; 347/19
See application file for complete search history.

(56) References Cited

U.S. PATENT DOCUMENTS

| | | | |
|---|---|---|---|
| 4,310,248 A * | 1/1982 | Meredith ...................... | 356/402 |
| 5,305,119 A * | 4/1994 | Rolleston et al. ............. | 358/522 |
| 5,598,272 A * | 1/1997 | Fisch et al. ..................... | 358/1.9 |
| 5,636,330 A * | 6/1997 | Barak ............................. | 358/1.9 |
| 5,638,117 A | 6/1997 | Engeldrum et al. | |
| 5,838,465 A * | 11/1998 | Satou et al. .................... | 358/520 |
| 6,030,066 A * | 2/2000 | Li et al. ........................... | 347/19 |
| 6,035,103 A | 3/2000 | Zuber | |
| 6,215,562 B1 * | 4/2001 | Michel et al. ................. | 358/1.9 |
| 7,034,968 B2 | 4/2006 | Bhaskar et al. | |
| 7,551,179 B2 * | 6/2009 | Sakakibara et al. ......... | 345/594 |
| 2005/0146737 A1 | 7/2005 | Ono | |

FOREIGN PATENT DOCUMENTS

| | | |
|---|---|---|
| EP | 0772116 | 5/1997 |
| WO | WO 00/36819 | 6/2000 |

* cited by examiner

*Primary Examiner* — Paul F Payer
(74) *Attorney, Agent, or Firm* — Law Office of Robert C. Sismilich

(57) ABSTRACT

Among various embodiments of the present disclosure, color calibration can be performed on a printing apparatus by using a preconfigured color map coded to reduce a color difference of a selected reference color sample relative to a color standard, where the selected reference color sample substantially matches a first test color sample printed by the printing apparatus. Installing the preconfigured color map can enable recalibrating the printing apparatus to use the preconfigured color map in adjusting an amount of a number of colorants utilized in printing a second test color sample to reduce the number of color differences of the second test color sample relative to the color standard.

26 Claims, 3 Drawing Sheets

*310*
PRINTING A FIRST TEST COLOR SAMPLE WITH A PRINTING APPARATUS ON A PRINT MEDIUM USING A NOMINAL COLOR SETTING

*320*
SELECTING FROM A SET OF REFERENCE COLOR SAMPLES A REFERENCE COLOR SAMPLE APPEARING TO SUBSTANTIALLY MATCH THE FIRST TEST COLOR SAMPLE

*330*
RECALIBRATING THE PRINTING APPARATUS WHEN THE SELECTED REFERENCE COLOR SAMPLE DIFFERS FROM A COLOR STANDARD, WHERE RECALIBRATING IS PERFORMED BY INSTALLING A PRECONFIGURED COLOR MAP CODED TO REDUCE A COLOR DIFFERENCE OF THE SELECTED REFERENCE COLOR SAMPLE RELATIVE TO THE COLOR STANDARD

COLOR CALIBRATION

INTRODUCTION

In some instances, a color printing apparatus may print a color on a print medium having a printed tint that differs from a user's desired shade of the color. The tint difference in the printed color relative to the preferred color may be caused by variation in an amount of one or more colorants used in halftoning the printed color relative to nominal amounts of the colbrants that would have been used in halftoning the preferred shade of the color. Such a variation in the amount of one or more colorants used in halftoning may contribute to a global shift in printed colors relative to preferred tints formed using nominal amounts of the colorants.

Determination of the variation of the printed color relative to the preferred tint of the color can be performed in a number of ways prior to recalibrating the color printing apparatus in an attempt to compensate for the variation. For example, embedded color sensors may be used to determine variations in amounts of colorants in a printed color sample relative to a color standard. This data can then be used for calibration.

However, in some instances, this process can be unreliable and/or slow due to errors and/or inconsistencies (e.g., noise) in the printed color and/or hardware limits. In addition, calibration using an embedded sensor may be complex due to modification of a large number of color map codes based on scanning printed colors.

DETAILED DESCRIPTION

Figure 1:
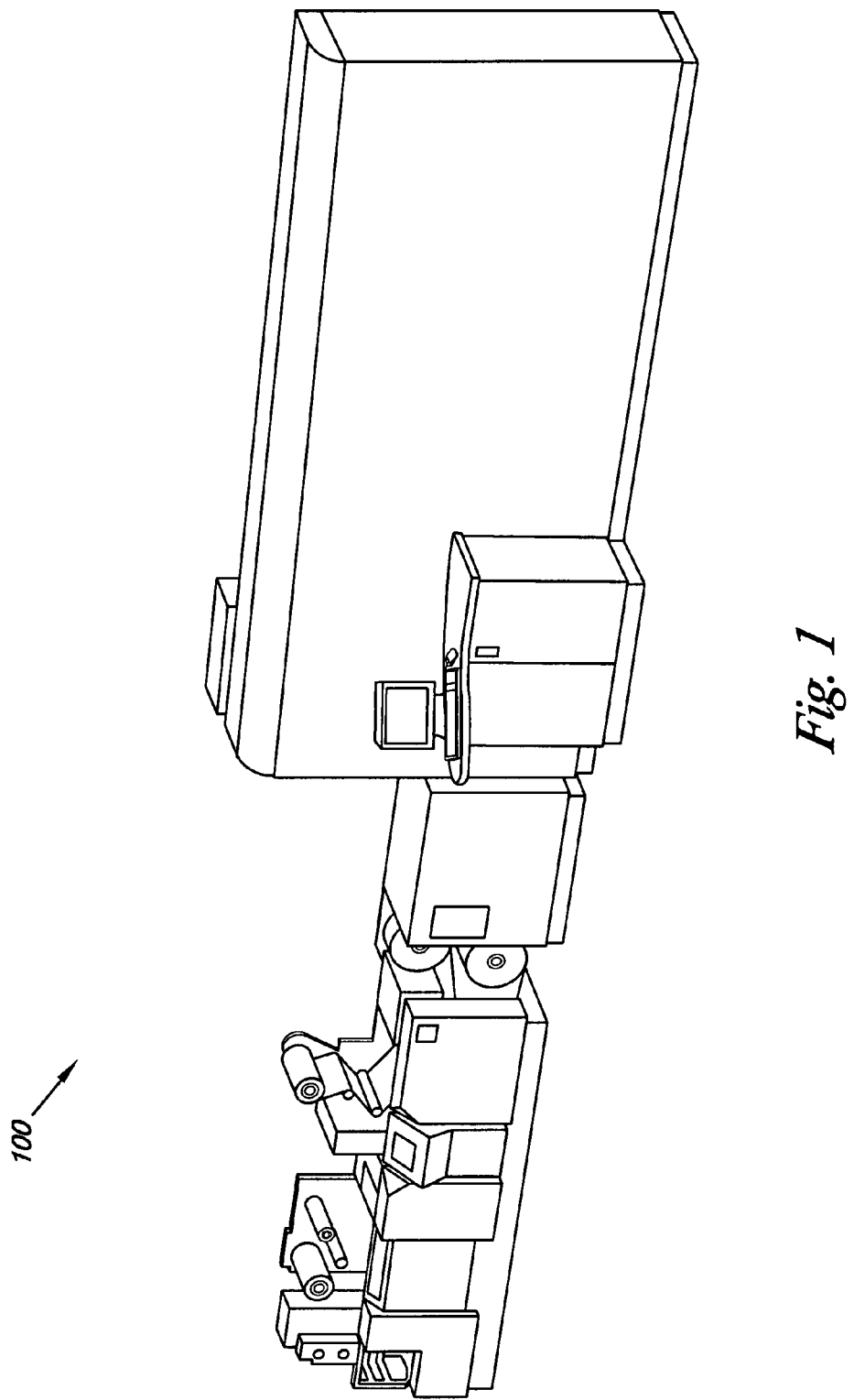
FIG. 1 illustrates an example of a printing apparatus suitable to receive preconfigured color calibration firmware according to embodiments of the present disclosure.

Some printing apparatuses produce a color tint when printing an image on a print medium that differs from the color intended by the manufacturer of the printing apparatus and/or the color desired by the user of the printing apparatus. For example, a printing apparatus using colorants that include cyan (C), magenta (M), and yellow (Y) may reproduce an image that originally contained balanced neutral gray elements, which can be halftoned with nominal amounts of the C, M, and Y colorants, as displaying these elements with an unbalanced color tint. The unbalanced color tint may result from high and/or low amounts of at least one of the C, M, and/or Y colorants relative to the nominal amounts of the C, M, and Y colorants.

"Nominal", as used in the present disclosure, can indicate, in various instances, an amount of colorant, a drop size, an inkjet nozzle size, etc., that contributes to producing a halftoned color tint in a number of printed pixels that conforms to the halftoned color tint intended, for example, by a manufacturer of the printing apparatus when using the nominal color settings. The color tint of a pixel, and an image formed using a number of such pixels, can differ from the intended color tint when, for example, a size of a nozzle of an inkjet pen is larger or smaller than the nominal size intended by the manufacturer.

As appreciated by one of ordinary skill in the relevant art, the halftoned color tint of pixels in a printed image can be determined by a color map operating in combination with a print engine to control one or more amounts of colorants (e.g., in the form of dots formed by ink drops on the print medium) applied to the print medium to achieve the intended halftoned color tint "Nominal" can also refer to the installed settings of a color map intended to achieve the halftoned color tint in a printed pixel conforming to the halftoned color tint intended by the manufacturer and/or the user of the printing apparatus.

In some instances, such as in a printing apparatus that forms an image on a print medium by ejecting drops from a number of inkjet pens, variances in the amounts of colorants relative to one or more nominal amounts can result from variance in drop size being ejected from one or more inkjet pens relative to a nominal drop size. For example, when an inkjet pen with C colorant ejects drops that are larger than the nominal drop size, a pixel intended to display a balanced neutral gray can display a tint shifted toward cyan when printed using the inkjet pen ejecting drops that are larger than the nominal drop size.

Moreover, any color printed using the C inkjet pen that ejects the large drops may be globally shifted toward a cyan tint that differs from the color intended by the manufacturer and/or the color desired by the user. However, such differences in printed colors relative to nominal colors may only call for recalibration when the differences are apparent to the user of the printing apparatus. In such instances, the user may delegate recalibration of the printing apparatus to a qualified person with skill in and equipment for (e.g., preprinted reference color samples) assessing differences in printed colors relative to nominal colors and experience in recalibrating a particular type of printing apparatus (e.g., a high output commercial printing apparatus).

Accordingly, among various embodiments of the present disclosure, color calibration can be performed by printing a first test color sample with a printing apparatus on a print medium using a nominal color setting (e.g., by implementing the existing calibration of the printing apparatus). For example, a print medium in the present disclosure can, in some embodiments, be a paper used for the color calibration on which the test color sample is printed. A reference color sample appearing to substantially match the test color sample can be selected from a set of reference color samples (e.g., through visual inspection by the qualified person). The printing apparatus can be recalibrated when the selected reference color sample differs from a color standard, where recalibrating is performed by installing a preconfigured color map coded to reduce a color difference of the selected reference color sample relative to the color standard.

FIG. 1 illustrates an example of a printing apparatus suitable to receive preconfigured color calibration firmware according to embodiments of the present disclosure. FIG. 1 illustrates a printing apparatus 100 that can use nominal values stored in a color map, which can include one or more one-dimensional (1D), two-dimensional (2D), and/or three-dimensional (3D) look-up tables (LUTs), among other embodiments, to print color images, including color characters, on a print medium (e.g., paper and/or transparent film, among others).

The printing apparatus 100 can use image data on which halftoning using available colorants to render pixels in a, for example, rasterized image can be performed. Other examples of output apparatuses include color copiers, color multi-function-peripherals, and color multi-functional printers, among other apparatuses.

The printing apparatus 100 illustrated in FIG. 1 can have memory coupled thereto, where executable instructions can, in various embodiments, be stored for execution by a processor. One example is memory having a color map usable in association with a print engine.

In various embodiments, the printing apparatus can include a number of inputs to receive instructions to be stored in the memory and/or a number of inputs for instructions that have been coded and stored on one or more preconfigured firmware units. For example, a preconfigured color map, coded and stored on a firmware unit, can be positioned in an input of the printing apparatus to enable recalibration of color output of the printing apparatus either by reprogramming the color map and/or print engine resident in the printing apparatus or replacement thereof.

In various embodiments, the printing apparatuses in the present disclosure can receive source image data associated with pixels in alphanumeric character text, image, symbol documents, and/or documents having a combination of such elements. In addition, embodiments can receive source image data from various sources.

For instance, embodiments can receive source image data from a number of apparatus types (e.g., a telecommunication apparatus, a telefaxing apparatus, a computing apparatus, a copying apparatus, and/or a scanning apparatus, among others) that can be connected to the printing apparatus 100. In some embodiments, all of the just-mentioned functionalities can be included in an All-In-One (AIO) system having an associated (e.g., embedded) image processing apparatus that can contribute to performing the functions described herein.

Printing apparatuses included in the present disclosure can use various printing techniques. Printing apparatuses, for example, can print on a print medium by using techniques for applying a colorant onto a print medium, such as firing drops through nozzles of inkjet pens and/or by using color toner and a laser. Various embodiments of printers, including inkjet and laser printers, can print color images, including color characters.

Printing apparatuses in the present disclosure can also use a number of various colorants in printing. Printing apparatuses can use, for example, three, four, six, or another number of colorants in various combinations in printing.

Printing apparatuses can, for example, use colorants such as C, M, and Y. In some embodiments, the C, M, and Y colorants (CMY) can be used along with additional colorants, for example, a black (K) colorant. In such embodiments, a printing apparatus can print using colorants, such as CMYK, in which black and non-black colorants can be used in various combinations to produce composite image pixels displaying various shades of gray and/or any other colors available in a color map installed on the printing apparatus.

Some printing apparatus embodiments can print using non-black colorants, such as CMY, in which such non-black colorants can be combined in an attempt to produce black and shades of gray, including a neutral balanced gray, among other colors, in a printed color image.

A printing apparatus of the present disclosure can produce a test color sample on a print medium, the color of which can be visually compared to, and/or measured in comparison with, a number of reference color samples in order to ascertain apparent color differences and/or similarities between the test color sample and the number of reference color samples. For example, a CMY inkjet printing apparatus can print a test color sample using the nominal color settings CMY for a balanced neutral gray.

In various embodiments, a test color sample can be produced by the printing apparatus for use, for example, by a qualified person (e.g., a service technician) in visually comparing the apparent color of the test color sample with the number of reference color samples and/or electronic comparison thereto by a color measuring device, such as a spectrophotometer. In some situations, substantially matching an apparent color of the test color sample with one of the number of reference color samples can be performed closer to perception parameters of the human visual system through use of visual inspection by the qualified person rather than using the color measuring device.

Through utilization of either a manual/visual or device-aided method, a standard displaying a defined color (i.e., a color standard) intended to be printed using nominal color settings for that color can be printed with a printer previously determined to contribute nominal amounts of colorants. The color standard can be compared with a set of reference color samples. Differences can be determined in one or more amounts of colorants (e.g., from CMY, CMYK, among other combinations of colorants) as measured by, for example, percentages or levels on a 0-255 scale of the various colorants in the reference color samples relative to the color standard.

In various embodiments, such differences can be used in coding a set of preconfigured color maps corresponding to the set of reference color samples, which can be installed in the printing apparatus to at least partially reduce the apparent color differences of the set of reference color samples relative to the color standard. Selecting an apparent color of a test color sample printed by a printing apparatus to be tested/recalibrated as matching a particular reference color sample can enable installation of the preconfigured color map corresponding to the particular reference color sample, which can at least partially reduce differences in subsequent output of the printing apparatus relative to the color standard.

Preconfigured color maps at least partially compensating for color differences between a particular color standard and a number of preprinted reference color samples can be coded prior to comparing a test color sample with the number of preprinted reference color samples. Each of such preconfigured color maps can, for example, be individually coded and stored on a preconfigured firmware unit.

Selecting a reference color sample that substantially matches a test color sample printed by the printing apparatus can enable selecting a preconfigured color map corresponding to the reference color sample. Installing a corresponding preconfigured color map and/or print engine (i.e., executable instructions for printing using a particular printer) in the printing apparatus can be used to recalibrate the color mapping of the printing apparatus to at least partially reduce the apparent difference in color output of the printing apparatus relative to the color standard for a particular color and, in some situations, at least partially reduce a global shift in color output.

Figure 2:
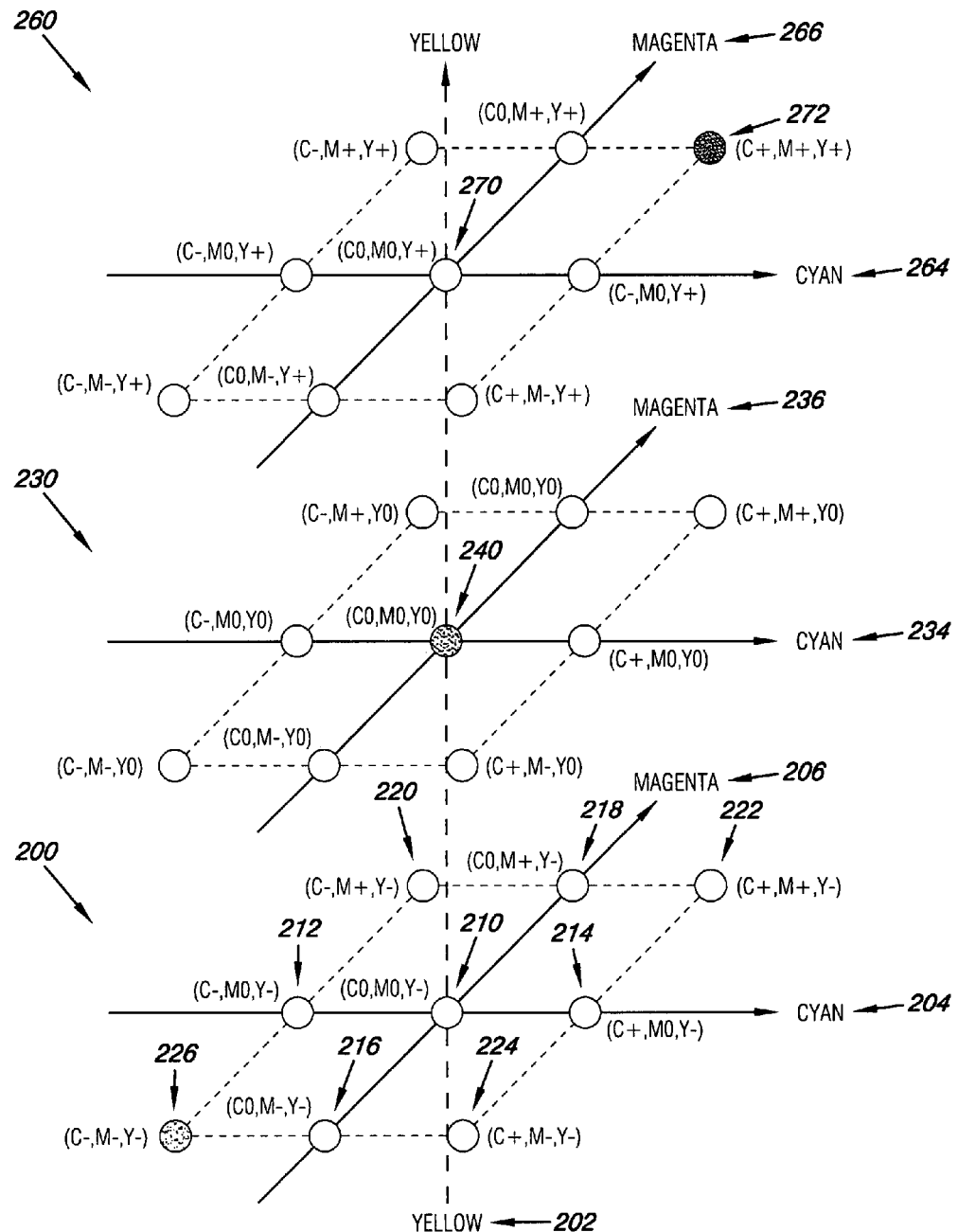
FIG. 2 illustrates a representation of three-dimensional color differences relative to a color standard according to an embodiment of the present disclosure.

FIG. 2 illustrates a representation of three-dimensional color differences relative to a color standard according to an embodiment of the present disclosure. Among various embodiments of the present disclosure, any color that can be printed by the printing apparatus using defined nominal settings can be compared to a defined color standard for that color.

The representation illustrated in FIG. 2 shows a range of various differences in color output using the C, M, and Y colorants relative to a color standard of balanced neutral gray formed from proper proportions of those colorants. In various embodiments, colorants not included in the CMY set of colorants can be added to the CMY set and/or substituted for the colorants of the CMY set. By way of example and not by way of limitation, K colorant can be included to form a CMYK set of colorants.

With inkjet printing apparatuses, proper proportions of the colorants can be achieved by ejecting from inkjet pens proper amounts of inks determined through the combination of color maps, halftoning, and/or drop sizes of colorants, among other factors. In some situations, proper proportions of the colorants can be achieved by ejecting from inkjet pens substantially equal drop sizes containing substantially equal amounts of the colorants. For example, differences from the balanced neutral gray illustrated in circle 240 of FIG. 2 can result from drop sizes of one or more of the CMY colorants being smaller and/or larger than the nominal drop size for each colorant.

A schematic as illustrated in FIG. 2 is formatted for human visual perception and comprehension. The schematic illustrated in FIG. 2 does not necessarily represent a particular embodiment of executable instructions utilized in accordance with the present disclosure. Only three circles illustrated in FIG. 2 (i.e., circles 226, 240, and 272) are shaded to show representations of balanced gray darkening from light to neutral to dark. However, as will be appreciated by one of ordinary skill in the relevant art, each circle can represent a halftoned color sample that is color shifted as described herein and as indicated in parentheses next to each circle in FIG. 2.

For purposes of illustration in FIG. 2, 3D (i.e., with dimensions being C, M, and Y) differences in gray color tint relative to the balanced neutral gray shown in circle 240 are shown in three color planes that can correspond to different levels of Y colorant. In some embodiments, a K colorant can be used in addition to the CMY set of colorants to form the CMYK set of colorants.

However, in some instances, as illustrated in FIG. 2, the K colorant is not shown because a neutral gray can be formed using a combination of the C, M, and/or Y colorants. As such, amounts of K colorant are, in some embodiments, not considered for neutral balance adjustment.

A lower plane 200 illustrated in FIG. 2 shows an amount of Y colorant on a Y colorant axis 202 that is lower than a nominal amount of Y colorant (Y−) (e.g., contributed by a drop size that is smaller than the nominal Y drop size) along with amounts of the C and M colorants ranging from low (i.e., C− and M−) to nominal (i.e., C0 and M0) to high (i.e., C+ and M+). A minus sign (−) following C, M, and/or Y in FIG. 2 represents a low amount of colorant and/or a small drop size, a zero (0) following C, M, and/or Y represents a nominal amount of colorant and/or a nominal drop size, and a plus sign (+) following C, M, and/or Y represents a high amount of colorant and/or a large drop size.

A middle color plane 230 shows a nominal amount of Y colorant (Y0) along with the amounts of the C and M colorants ranging from low to nominal to high. Similarly, an upper color plane 260 shows a high amount of Y colorant (Y+) along with the amounts of the C and M colorants ranging from low to nominal to high.

In the embodiment illustrated in FIG. 2, the middle plane 230 includes the circle 240, indicating a balanced neutral gray that can be used as a reference point or, in some embodiments, as the color standard for balanced neutral gray. That is, in the embodiment illustrated in FIG. 2, the circle 240 indicating balance neutral gray is shown as being formed from nominal amounts of C, M, and Y colorants (C0, M0, Y0). All circles illustrated in FIG. 2 other than the circle 240 indicating balanced neutral gray represent a number of gray color tints caused by low and/or high amounts of at least one of the C, M, and/or Y colorants relative to the nominal amounts shown in circle 240.

In the lower plane 200 on the Y colorant axis 202, a central circle 210 indicates a lower than nominal amount of Y colorant (Y−) along with nominal amounts of C and M colorants (C0, M0). The lower than nominal amount of Y colorant in circle 210 can contribute to a tint in a gray color that is unbalanced relative to the balanced neutral gray in circle 240. Progressing upward on the Y colorant axis 202 can, in some embodiments, indicate increasing drop sizes for the Y colorant.

As previously stated, in some situations, an amount of colorant differing from nominal can result from one or more drop sizes used in a number of pixels differing from the nominal drop size for that colorant. The embodiment illustrated in FIG. 2 can, for example, indicate that a low or high amount of colorant (e.g., C, M, and/or Y) results from a drop size that is beyond lower or upper limits, respectively, of nominal drop size.

In addition to the Y colorant axis 202 of FIG. 2, the lower plane 200 includes two axes rectilinearly arranged relative to each other and the Y axis 202. A C colorant axis 204 extends horizontal to the surface of FIG. 2 and intersects the Y colorant axis 202 at circle 210, which indicates a lower than nominal amount of Y colorant (Y−) along with nominal amounts of C and M colorants (C0, M0). Progressing to the right on the C colorant axis 204 can, in some embodiments, indicate increasing drop sizes for the C colorant.

An M colorant axis 206 can indicate being positioned perpendicular to the surface of FIG. 2 and similarly intersecting the Y colorant axis 202 at circle 210. Progressing into the page on the M colorant axis 206 can, in some embodiments, indicate increasing drop sizes for the M colorant.

Shown to the left of the central circle 210 on the C axis 204 is a circle 212 that, in some embodiments, indicates a gray color having a tint formed using small drop sizes of the C and Y colorants along with nominal M drop sizes (i.e., C−, M0, Y−). To the right on the C axis 204 is a circle 214 that indicates a gray color having a tint formed using a large drop size for the C colorant, a nominal drop size for the M colorant, and a small drop size for the Y colorant (i.e., C+, M0, Y−).

As represented below and to the left of the central circle 210 on the M axis 206 is a circle 216 that indicates a gray color having a tint formed using a nominal drop size for the C colorant and small drop sizes for the M and Y colorants (i.e., C0, M−, Y−). As represented above and to the right of the central circle 210 on the M axis 206 is a circle 218 that indicates a gray color having a tint formed using a nominal drop size for the C colorant, a large drop size for the M colorant, and a small drop size for the Y colorant (i.e., C0, M+, Y−).

To the left of circle 218 in plane 200 is a circle 220 that is not on the Y axis 202, the C axis 204, or the M axis 206, which can indicate that colorant amounts and/or drop sizes are not nominal for any of the colorants. The circle 220 indicates a gray color having a tint formed, in some embodiments, using a small drop size for the C and Y colorants and a large drop size for the M colorant (i.e., C−, M+, Y−).

To the right of circle 218 in plane 200 is a circle 222 that also is not on the Y axis 202, the C axis 204, or the M axis 206. The circle 222 indicates a gray color having a tint formed using large drop sizes for the C and M colorants and a small drop size for the Y colorant (i.e., C+, M+, Y−).

To the right of circle 216 in plane 200 is a circle 224 that also is not on any of the color axes. The circle 224 indicates a gray color having a tint formed using a large drop size for the C colorant and small drop sizes for the M and Y colorants (i.e., C+, M−, Y−).

To the left of circle 216 in plane 200 is another circle 226 that is not on any of the color axes. The circle 226 indicates a gray color having a tint formed using small drop sizes for the C, M, and Y colorants (i.e., C−, M−, Y−).

In some situations, having a small drop size for all of the colorants used in forming a gray pixel, as shown in circle 226, can result in an approximately balanced neutral gray that only differs from the nominally balanced neutral gray (e.g., as shown in circle 240) by the pixel being an approximately balanced lighter gray (e.g., the colorants each having a lower but approximately balanced density). In some embodiments of the present disclosure, a balanced but lighter gray as shown in circle 226 can be considered as equivalent to the nominally balanced gray, and therefore installation of a replacement preconfigured color map and/or print engine to reduce the differences in the color intensities may not be implemented. However, in some embodiments, a replacement preconfigured color map and/or print engine may be implemented.

The middle plane 230 illustrated in FIG. 2 shows the central circle 240 indicating a nominally balanced neutral gray that is at the nominal Y colorant point on the Y axis 202, at the nominal C colorant point on the C axis 234, and the nominal M colorant point of the M axis 236 of middle plane 230 (i.e., C0, M0, Y0). The various circles arranged in the middle plane 230 around the central circle 240 can, in some embodiments, indicate small and large drop C and M colorant sizes corresponding to those described immediately above, although differing in the middle plane 230 by all the circles having nominal Y drop sizes.

The upper plane 260 illustrated in FIG. 2 shows a central circle 270 as indicating nominal amounts of the C and M colorants along with a high amount of the Y colorant (i.e., C0, M0, Y+), which can, in some embodiments, correspond with nominal drop sizes for the C and M colorants and large drop sizes for the Y colorant. The various circles arranged in the upper plane 260 around the central circle 270 at the intersection of the Y axis 202, the C axis 264, and the M axis 266 can, in some embodiments, indicate small and large drop sizes for the C and M colorants corresponding to those described immediately above, although differing in the upper plane 260 by all the circles having large Y drop sizes.

Hence, the circle 272 in the upper right corner of FIG. 2 indicates a gray color having a tint formed using large drop sizes for the C, M, and Y colorants (i.e., C+, M+, Y+). In some situations, having a large drop size for all of the colorants used in forming a gray pixel, as shown in circle 272, can result in an approximately balanced neutral gray that only differs from the nominally balanced neutral gray (e.g., as shown in circle 240) by the pixel being an approximately balanced darker gray (e.g., the colorants each having a higher but approximately balanced density).

In some embodiments of the present disclosure, as with the example having an approximately balanced but lighter gray (e.g., as shown in circle 226), an approximately balanced but darker gray as shown in circle 272 can be considered equivalent to the nominally balanced gray, and therefore installation of a replacement preconfigured color map and/or print engine to reduce the differences in the color intensities may not be implemented. However, in some embodiments, a replacement preconfigured color map and/or print engine may be implemented.

The various circles illustrated in FIG. 2 can alternatively represent output of colorants (e.g., C, M, and Y) used in creating preprinted reference color samples. That is, instead of representing the various possible contributions of the colorants (e.g., in a test color sample, as just described) to balanced grays (i.e., neutral at circles 226, 240, 266) or unbalanced grays (i.e., tinted at all circles other than 226, 240, 266), the circles illustrated in FIG. 2 can show a number of possible color intensity (e.g., density) combinations to which printed output (e.g., the test color sample) can be compared and/or matched.

For example, substantially nominal amounts of all colorants (e.g., C, M, and Y), which can, in some embodiments, be contributed by nominal drop sizes ejected from each of the inkjet pens, can form a number of pixels that appear to display a balanced neutral gray (e.g., at circle 240), as described above. Whether the printed pixels being examined actually display a balanced neutral gray can be confirmed by, in some embodiments, visual comparison to a number of preprinted reference color samples.

The preprinted reference color samples are printed using a printing apparatus, other than the printing apparatus being tested, that uses a nominal color table combined with the selected set of colorants that, in some embodiments, are ejected by a set of inkjet pens. In some embodiments, a printing apparatus can be used for printing the preprinted reference color samples that, for example, have three colorants (e.g., C, M, and Y) each used by three sets of three inkjet pens that eject amounts of each colorant determined to be low, nominal, and high (e.g., corresponding to small, nominal, and large drop sizes). As illustrated in FIG. 2, the three colorants each have, for example, small, nominal, and large drop sizes resulting in 3×3×3=27 preprinted reference color samples.

The preprinted reference color samples, for example, as illustrated in FIG. 2, can represent possible color shifts from a neutral balanced gray as shown in circle 240. That is, the reference color samples can include each of a possible number of combinations of variations in colorant intensity based upon selected parameters.

For example, as illustrated in FIG. 2, the selected parameters for the reference color samples can be based upon low, nominal, and high amounts of colorant. In some embodiments, these parameters can correspond, respectively, to drop size being smaller than the lower limit relative to a range of nominal drop sizes, drop size being within the range of nominal drop sizes, and drop size being larger than the upper limit of the range of nominal drop sizes. As previously described, the illustration in FIG. 2 shows that using three colorants (e.g., C, M, and Y) that each can contribute three levels of colorant (e.g., low, nominal, and high) can result in 3×3×3=27 different reference color samples.

In some embodiments, the selected parameters can represent amounts of colorants and/or drop sizes, for example, being more than 10% higher or lower than a nominal value, 5% higher or lower than the nominal value, or at the nominal value (i.e., 0%). Approximations can be determined for the discrete percentages just mentioned because deviations from nominal values can be continuous. By way of example and not by way of limitation, the −10% value can represent from minus infinity to halfway between −10% and −5%. That is, the −10% value can represent from −7.5% to minus infinity. The −5% value can represent a range between −7.5% and halfway between the −5% value and the nominal value (i.e., −2.5%). The 0% nominal value can represent from −2.5% to +2.5%. The +5% value can represent a range between +2.5% and +7.5% and the +10% value can represent from +7.5% to positive infinity.

As such, using the three colorants that each can contribute five levels of colorant can result in 5×5×5=125 different reference color samples. The determinations of numbers of reference color samples just described are presented by way of example and not by way of limitation. Hence, any number of parameters can be selected, which can result in any number of reference samples.

In practice, using a lower number of reference color samples to which a test color sample is compared by visual inspection in order to select one reference color sample that substantially matches the test color sample can be easier for a qualified person (e.g., require less time). However, using a higher number of reference samples can enable selection of one that is a closer match to the test color sample, with a corresponding preconfigured color map that more finely compensates for variations in colorant amounts in the reference color samples (and the matched test color sample) relative to nominal amounts of colorant in the color standard.

As illustrated in FIG. 2, the twenty-seven combinations (i.e., sets) of CMY drop sizes in the reference color samples shown can, in some embodiments, be printed by inkjet pens that use the three colorants ejected in three drop sizes. For example, a C inkjet pen that ejects small size ink drops can be used with a second C inkjet pen that ejects nominal size ink drops and a third C inkjet pen that ejects large size ink drops. Similarly, three M inkjet pens can eject small, nominal, and large size ink drops and three Y inkjet pens also can eject small, nominal, and large size ink drops.

As such, in some embodiments, the twenty-seven reference color samples (i.e., 3×3×3=27) can be printed using nine inkjet pens previously determined to eject small, nominal, and large drop sizes. The reference color samples can be printed using a nominal color map, nominal firmware, and/or a nominal print engine operating through the nine inkjet pens to form the twenty-seven combinations (i.e., sets) of inkjet pens to print the twenty-seven reference color samples.

Among the twenty-seven reference color samples illustrated in FIG. 2, the circle 240 corresponds to, for example, a neutral balanced gray formed using nominal output of each colorant (e.g., C, M, and Y). The other twenty-six reference color samples can represent, in some embodiments, color shifts resulting from variations in drop size ejected from one or more of the inkjet pens.

Hence, twenty-six preconfigured color calibration tables can be coded to recalibrate the existing color table of the printing apparatus to at least partially compensate for such color shifts. In some embodiments, matching a test color sample with the reference color samples indicated by circles 226 and 272 can result in leaving the existing color table unchanged (i.e., not recalibrated) because the circles 226 and 272 can represent an approximate color balance, although they can be lighter or darker, respectively, than, for example, the neutral balanced gray shown at circle 240. The twenty-six preconfigured color calibration tables just described can, in various embodiments, be coded and stored in preconfigured firmware to be installed for recalibration of the printing apparatus based on matching a test color sample with a particular reference color sample.

As stated above, preconfigured color maps at least partially compensating for color differences between a particular color standard and a number of preprinted reference color samples can be coded prior to comparing a test color sample with the number of preprinted reference color samples. Each of such preconfigured color maps can, for example, be individually coded and stored on a preconfigured firmware unit.

Selecting a reference color sample that substantially matches a test color sample printed by the printing apparatus can enable selecting a preconfigured color map corresponding to the reference color sample. Installing a corresponding preconfigured color map and/or print engine (i.e., executable instructions for printing using a particular printer) in the printing apparatus can be used to recalibrate the color map of the printing apparatus.

Recalibrating the color map can enable at least partially reducing the apparent difference in color output of the printing apparatus relative to the matched reference color sample used as basis for the recalibrated color table relative to the color standard. As such, recalibrating the color map can enable at least partially reducing the apparent difference in color output of the printing apparatus relative to the color standard for a particular color and, in some situations, at least partially reduce a global shift in color output.

In various embodiments, various color maps (e.g., 1D, 2D, and/or 3D LUTs) can be installed in the printing apparatus to at least partially reduce the apparent difference in color output of the printing apparatus relative to the color standard. Each of such color maps can, for example, be individually coded and stored on a preconfigured firmware unit. In some embodiments, preconfigured firmware units can include executable instructions for reprogramming the color map and/or print engine already resident in the printing apparatus. In some embodiments, the preconfigured firmware units can serve as replacements for the color map and/or print engine already resident in the printing apparatus.

Selecting a reference color sample that substantially matches a test color sample printed by the printing apparatus to be tested and/or recalibrated can enable selecting a preconfigured firmware unit corresponding to the reference color sample. Installing the preconfigured firmware unit corresponding to the selected reference color sample in the printing apparatus can be used to recalibrate the color mapping of the printing apparatus (e.g., either by reprogramming or replacement) to at least partially reduce the apparent difference in color output of the printing apparatus relative to the color standard for a particular color. In some situations, such recalibration can at least partially reduce a global shift in color output.

In various embodiments, instructions can be executed to use a preconfigured color map and/or corresponding preconfigured firmware for reducing an apparent color difference (e.g., a color difference contributed to by a number of color differences in the number of colorants used in the inkjet pens) of the printing apparatus to be calibrated relative to a nominal printing apparatus that prints the color standard. Recalibration as such can enable a closer match of color output between the nominal printing apparatus and the recalibrated printing apparatus. The corresponding preconfigured color map can be installed and/or the corresponding preconfigured firmware can be loaded to enable recalibrating the printing apparatus to adjust colorants utilized in the tested/recalibrated printing apparatus.

Such adjustment can reduce the color difference relative to the color standard of a second test color sample printed after recalibration when compared to the first test color sample printed before recalibration. In some embodiments, such adjustment can be performed by adjusting an amount of colorant ejected by at least one inkjet pen to reduce the number of color differences of the second test color sample relative to the color standard, which can include adjusting the number of drops ejected by at least one inkjet pen in the second test color sample relative to the first test color sample.

In various embodiments, installing the preconfigured color map to recalibrate the printing apparatus to use the preconfigured color map can include instructions executable for adjusting the amount of the number of colorants utilized in printing the second test color sample to achieve a more neutral color balance (e.g., in a balanced neutral gray) in the second test color sample relative to the color standard (e.g., the balanced neutral gray) and, in addition, the first test color sample. Achieving a more neutral color balance in the second test color sample printed after recalibration can, in some embodiments, include using the installed preconfigured color map to globally recalibrate output of all colors based upon achieving the more neutral color balance relative to the color standard and, in addition, the first test color sample. Using the installed preconfigured color map to globally recalibrate output of all colors can, in some embodiments, include using a 3D color map (e.g., a 3D LUT) in adjusting the amount of colorant ejected by at least one inkjet pen.

By way of example and not by way of limitation, as illustrated in FIG. 2, circle 210 can indicate that a low amount of Y colorant has been utilized relative to nominal amounts of the C and M colorants (C0, M0, Y−) in an attempt to print a neutral balanced gray. In some instances, the low amount of Y colorant can result from small drop sizes being ejected from the inkjet pen containing the Y colorant. In some embodiments, installing a preconfigured color map can be utilized to recalibrate output of the Y colorant by increasing the number of drops of Y colorant ejected from the inkjet pen into each pixel containing the Y colorant to compensate for the small size of each drop. Accordingly, increasing the number of ejected drops containing the Y colorant can result in the tint of circle 210 being shifted to indicate nominal output of each of the C, M, and Y colorants (C0, M0, Y0), for example, as shown in the neutral balanced gray of circle 240 illustrated in FIG. 2.

In various embodiments of the present disclosure, a color calibration system can include a printing apparatus to print a test color sample on a print medium using a nominal color setting (e.g., a number of nominal settings for a number of colorants ejected by a number of inkjet pens). The system can also include an input to install instructions (e.g., either by reprogramming or replacement of resident programming) that are coded and stored in a preconfigured firmware unit, where the instructions utilize a preconfigured color map for recalibration of a color map used in printing the test color sample.

In addition, the system can include an instrumentality to execute recalibration of the printing apparatus to reduce the color difference of a selected reference color sample relative to a color standard. Hence, recalibration of the printing apparatus can reduce the color difference of a second test color sample printed after recalibration relative to the color standard and, in addition, the first color sample. Reduction of the color difference can be included in the instructions that are coded and stored in the preconfigured firmware unit. In some embodiments, determination of the first test color sample that substantially matches the selected reference color sample can be performed through visual inspection by a qualified person.

The color differences can result from a variance in an amount of at least one colorant used in the first test color sample (e.g., as substantially reflected by the selected reference color sample) relative to a nominal amount of a number of colorants used in the color standard. In some embodiments, the variance in the amount of at least one colorant can result from variance in drop size ejected from at least one inkjet pen relative to nominal drop size and the preconfigured firmware color map can enable adjustment of the amount of at least one colorant by adjustment of a number of drops of at least one colorant being ejected by an inkjet pen.

Figure 3:
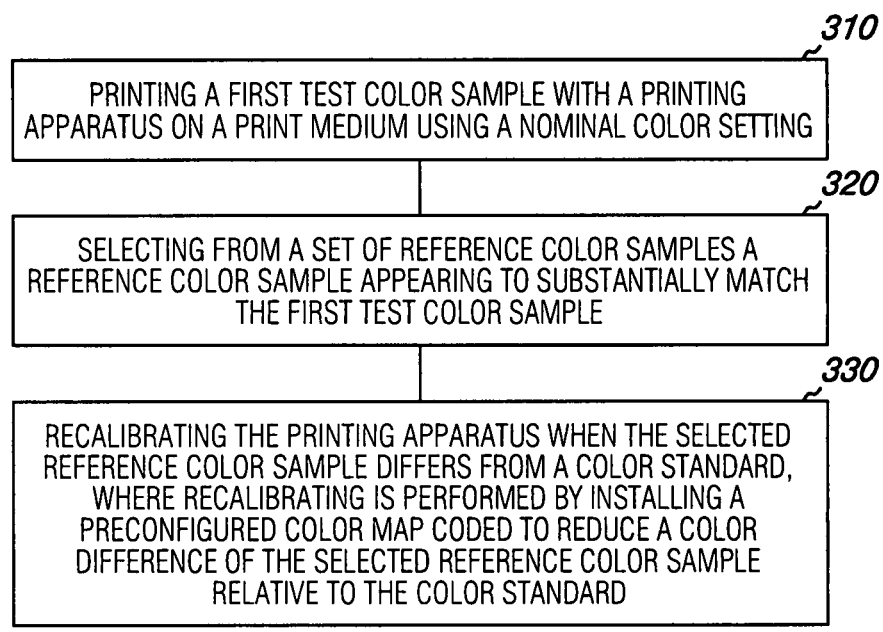
FIG. 3 is a block diagram illustrating a method of color calibration according to an embodiment of the present disclosure.

FIG. 3 is a block diagram illustrating a method of color calibration according to an embodiment of the present disclosure. Unless explicitly stated, the method embodiments described herein are not constrained to a particular order or sequence. Additionally, some of the described method embodiments, or elements thereof, can occur or be performed at the same, or at least substantially the same, point in time.

Embodiments described herein can be performed using logic, software, firmware, hardware, application modules, and ASICs, or combinations of these elements, and the like, to perform the operations described herein.

Embodiments as described herein are not limited to any particular operating environment or to software/firmware coded and stored in a particular programming language.

The elements described can be resident on the systems, apparatuses, and/or devices shown herein, or otherwise. Logic suitable for performing embodiments of the present disclosure can be resident in one or more devices and/or locations. Processing devices used to execute operations described herein can include one or more individual modules that perform a number of functions, separate modules connected together, and/or independent modules.

The embodiment illustrated in FIG. 3 includes printing a first test color sample with a printing apparatus on a print medium using a nominal color setting (e.g., a number of nominal settings for a number of colorants ejected by a number of inkjet pens), as shown in block 310. In various embodiments, printing the test color sample can include using a plurality of colors usable in the printing apparatus, where the test color sample displays an apparent color that is a mixture of the plurality of colors. Using the plurality of colors can include using the plurality of colors to print a test color sample having a neutral color with a nominal setting for each of the plurality of colors.

Block 320 of the embodiment shown in FIG. 3 includes selecting from a set of reference color samples a reference color sample appearing to substantially match the first test color sample. In various embodiments, the set of reference color samples selected from can each have an apparent color that correlates with an amount of colorant ranging from low to nominal to high for each of the plurality of colors used to print the test color sample.

In some embodiments, printing the test color sample can be performed with an inkjet printing apparatus, where having the apparent color correlate with an amount of colorant ranging from low to nominal to high can include having the apparent color correlate with an amount of colorant contributed by drop sizes ranging from small to nominal to large. In various embodiments, selecting from the number of reference color samples the reference color sample appearing to substantially match the test color sample can be determined by a color measuring device and/or by a qualified person, for example, through visual inspection, comparison, and selection.

As shown in block 330, the printing apparatus can be recalibrated when the selected reference color sample differs from a color standard, where recalibrating can be performed by installing a preconfigured color map coded to reduce an apparent color difference (e.g., contributed to by a number of color differences in colorant ejected by inkjet pens relative to nominal) of the selected reference color sample relative to the color standard. That is, the color difference of a test color sample can be reduced for a recalibrated printing apparatus relative to the color standard printed by the nominal printing apparatus.

In various embodiments, recalibrating the printing apparatus can include installing preconfigured firmware coded with instructions for utilizing a color map to reduce the color difference of the selected reference color sample relative to the color standard. As such, the color difference of a second test color sample printed by the printing apparatus after recalibration can be reduced relative to the color standard printed by the nominal printing apparatus and, in addition, the first test color sample.

The installed preconfigured firmware can correlate with the reference color sample selected as appearing to substantially match the first test color sample, where operating the preconfigured firmware reduces the color difference of the selected reference color sample relative to the color standard. As such, operating the preconfigured firmware can reduce the color difference of the second test color sample, printed by the printing apparatus after recalibration, relative to the color standard printed by the nominal printing apparatus and, in addition, the first test color sample.

In various embodiments, the installed preconfigured firmware can operate in combination with a print engine capable of using the preconfigured color map to reduce the color difference of the selected reference color sample relative to the color standard by adjusting numbers of drops ejected by inkjet pens. As such, the preconfigured installed firmware can operate in combination with the print engine to reduce the color difference of the second test color sample, printed by the printing apparatus after recalibration, relative to the color standard, printed by the nominal printing apparatus, by adjusting numbers of drops ejected by inkjet pens.

Although specific embodiments have been illustrated and described herein, those of ordinary skill in the relevant art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein, will be apparent to those of ordinary skill in the relevant art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure need to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of color calibration, comprising:
    printing a first test color sample with a printing apparatus on a print medium using a nominal color setting;
    selecting, from a set of reference color samples not printed with the printing apparatus, a reference color sample appearing to substantially match the first test color sample, the selected reference color sample indicative of a particular preconfigured color map, in a set of preconfigured color maps, coded to reduce a color difference of the selected reference color sample relative to a color standard, wherein each of the preconfigured color maps in the set corresponds to one of the set of reference color samples; and
    recalibrating the printing apparatus when the selected reference color sample differs from the color standard, where the recalibrating is performed by replacing a color map used to print the first test color sample with the particular preconfigured color map, and wherein the preconfigured color maps in the set are coded prior to the selecting of the reference color sample.

2. The method of claim 1, where printing the first test color sample includes using a plurality of colors usable in the printing apparatus, where the first test color sample is a single apparent color that is a mixture of at least two of the plurality of colors.

3. The method of claim 2, where using the plurality of colors includes using the plurality of colors to print a first test color sample having a neutral color with nominal settings for each of the plurality of colors.

4. The method of claim 2, where each one of the set of reference color samples is a different single apparent color that correlates with an amount of colorant ranging from low to nominal to high for each of the plurality of colors used to print the first test color sample.

5. The method of claim 4, where printing the first test color sample with a printing apparatus includes printing with an inkjet printing apparatus.

6. The method of claim 5, where having the apparent color correlate with an amount of colorant ranging from low to nominal to high includes having the apparent color correlate with an amount of colorant contributed by drop sizes ranging from small to nominal to large.

7. The method of claim 4 wherein, for some ones of the set of reference color samples, the amount of colorant for one of the plurality of colors differs from the amount of colorant of another of the plurality of colors.

8. The method of claim 1, where selecting from the set of reference color samples the reference color sample appearing to substantially match the first test color sample includes appearing to substantially match as determined by a color measuring device.

9. The method of claim 1, where selecting from the set of reference color samples the reference color sample appearing to substantially match the first test color sample includes appearing to substantially match as determined by a qualified person.

10. The method of claim 1, where recalibrating the printing apparatus includes installing preconfigured firmware coded with instructions for utilizing the particular preconfigured color map to reduce the color difference of the selected reference color sample relative to the color standard.

11. The method of claim 10, where installing preconfigured firmware includes installing preconfigured firmware correlating with the reference color sample selected as appearing to substantially match the first test color sample, where operating the preconfigured firmware to print after installation reduces a color difference of a second test color sample relative to the color standard.

12. The method of claim 11, where the method includes installing preconfigured firmware including a print engine capable of using the particular preconfigured color map to reduce the color difference of the second test color sample relative to the color standard by adjusting numbers of drops ejected by inkjet pens.

13. The method of claim 1, wherein the particular preconfigured color map is selected from the set of preconfigured color maps based on the selected reference color sample.

14. The method of claim 1, wherein the particular preconfigured color map is a look-up table configured to control an amount of at least one colorant applied to the print medium to produce an intended halftoned color tint of a pixel.

15. The method of claim 1, wherein the set of reference color samples is preprinted on a different printing apparatus.

16. The method of claim 1, wherein each of the set of reference color samples is preprinted using a nominal color map and an inkjet pen for each color of colorant used in the printing apparatus, wherein each inkjet pen ejects drops of a particular drop size, and wherein each of the reference color samples is preprinted using a different combination of the drop sizes.

17. A medium having executable instructions stored thereon for executing a method for color calibration on a printing apparatus comprising:
  using a preconfigured color map coded to reduce a color difference of a selected reference color sample relative to a color standard, where the selected reference color sample is selected from a set of color reference samples not printed by the printing apparatus so as to substantially match a first test color sample printed by the printing apparatus, wherein the preconfigured color map is one of a set of color maps coded prior to identifying the selected reference color sample, wherein each color map in the set of color maps corresponds to one of the set of reference color samples, and wherein the selected reference color sample is indicative of the preconfigured color map; and
  installing the preconfigured color map to replace a color map used to print the first test color sample and recalibrate the printing apparatus to use the preconfigured color map in adjusting an amount of a number of colorants utilized in printing a second test color sample, where adjusting reduces the number of color differences of the second test color sample relative to the color standard.

18. The medium of claim 17, where adjusting an amount of the number of colorants utilized in printing the second test color sample includes adjusting an amount of colorant ejected by at least one inkjet pen to reduce the color difference of the second test color sample relative to the color standard.

19. The medium of claim 18, where adjusting the amount of colorant ejected by at least one inkjet pen includes adjusting the number of drops ejected by at least one inkjet pen in the second test color sample relative to the first test color sample.

20. The medium of claim 17, where installing the preconfigured color map to recalibrate the printing apparatus to use the preconfigured color map includes adjusting the amount of the number of colorants utilized in printing the second test color sample to achieve a more neutral color balance in the second test color sample relative to the first test color sample.

21. The medium of claim 20, where achieving a more neutral color balance in the second test color sample includes using the installed preconfigured color map to globally recalibrate output of all colors based upon achieving the more neutral color balance relative to the first test color sample.

22. The medium of claim 21, where using the installed preconfigured color map to globally recalibrate output of all colors includes using a three-dimensional color map in adjusting the amount of colorant ejected by at least one inkjet pen.

23. A color calibration system, comprising:
  a printing apparatus to print a test color sample on a print medium using a nominal color setting;
  means to install instructions that are coded and stored in a preconfigured firmware unit, where the preconfigured instructions contain a preconfigured color map for replacement of a color map used in printing the test color sample; and
  means to execute recalibration of the printing apparatus to reduce a color difference of a selected reference color sample relative to a color standard, where reduction of the color difference is included in the instructions that are coded and stored in the preconfigured firmware unit, wherein the selected reference color sample is selected from a set of color reference samples to substantially match the test color sample, wherein the set of color reference samples are not printed on the printing apparatus, wherein the preconfigured color map is one of a set of color maps in the printing apparatus coded prior to choosing the selected reference color sample, wherein each color map in the set of color maps corresponds to one of the set of reference color samples, and wherein the selected reference color sample is indicative of the preconfigured color map.

24. The system of claim 23, where the test color sample substantially matches the selected reference color sample, the match being determined through visual inspection by a qualified person.

25. The system of claim 24, where the color difference results from a variance in an amount of at least one colorant used in the test color sample relative to a nominal amount of a number of colorants used in the color standard.

26. The system of claim 25, where the variance in the amount of at least one colorant results from variance in drop size ejected from at least one inkjet pen relative to nominal drop size and the preconfigured firmware color map enables adjustment of the amount of at least one colorant by adjustment of a number of drops of at least one colorant being ejected by an inkjet pen.

* * * * *